(12) United States Patent
Kaladgi et al.

(10) Patent No.: US 10,380,377 B2
(45) Date of Patent: Aug. 13, 2019

(54) PREVENTION OF SHOULDER SURFING

(71) Applicant: CA, Inc., New York, NY (US)

(72) Inventors: Mohammed Mujeeb Kaladgi, Bangalore (IN); Ruqiya Nikhat Kaladgi, Bangalore (IN); Jameel Ahmed Kaladgi, Bangalore (IN); Yashwant Ramkishan Sawant, Maharashtra (IN)

(73) Assignee: CA, Inc., New York, NY (US)

( * ) Notice: Subject to any disclaimer, the term of this patent is extended or adjusted under 35 U.S.C. 154(b) by 231 days.

(21) Appl. No.: 15/086,973

(22) Filed: Mar. 31, 2016

(65) Prior Publication Data

US 2017/0286715 A1 Oct. 5, 2017

(51) Int. Cl.
*G06F 7/04* (2006.01)
*G06F 21/62* (2013.01)
*G06F 21/36* (2013.01)

(52) U.S. Cl.
CPC .......... *G06F 21/6245* (2013.01); *G06F 21/36* (2013.01)

(58) Field of Classification Search
CPC .. G06F 3/0416; G06F 3/048; G06F 17/30528; G06F 21/46; G06F 8/33; G06F 2221/2113; G06F 3/0488; G06F 3/017; G06F 3/04845; G06F 1/3231; G06F 2200/1614; G06F 2203/04808; G06F 3/012; G06F 3/0216; H04L 63/083; H04L 67/22; H04L 67/306; H04L 51/12
See application file for complete search history.

(56) References Cited

U.S. PATENT DOCUMENTS

| | | | |
|---|---|---|---|
| 9,082,050 B2* | 7/2015 | Fujishita | G06K 15/005 |
| 9,288,387 B1* | 3/2016 | Keller | H04N 21/44218 |
| 9,507,967 B2* | 11/2016 | Wurster | G06F 21/75 |
| 9,813,531 B2* | 11/2017 | Setlur | H04M 1/0222 |
| 2008/0209442 A1* | 8/2008 | Setlur | H04M 1/0222 719/318 |
| 2012/0078741 A1* | 3/2012 | DeLine | B67D 7/08 705/26.1 |
| 2013/0135350 A1* | 5/2013 | Santos-Gomez | G06F 1/1694 345/649 |
| 2013/0191911 A1* | 7/2013 | Dellinger | G06F 3/0488 726/19 |
| 2013/0218721 A1* | 8/2013 | Borhan | G06Q 20/322 705/26.41 |
| 2014/0201844 A1* | 7/2014 | Buck | G06F 21/50 726/26 |

(Continued)

*Primary Examiner* — Farid Homayounmehr
*Assistant Examiner* — Lizbeth Torres-Diaz
(74) *Attorney, Agent, or Firm* — Baker Botts L.L.P.

(57) ABSTRACT

In accordance with the teachings of the present disclosure, a method is provided for reducing the chances of shoulder surfing. The method may include determining an approximate angle of orientation of a mobile device and selecting one of first or second input key layouts, based upon the approximate angle of orientation. The first input key layout may be a standard layout of alphanumeric characters and the second input key layout may be a disordered layout of the alphanumeric characters. The method may also include displaying the selected one of the first or second input key layouts at a graphical user interface of the mobile device and receiving an input of sensitive information at the graphical user interface.

20 Claims, 6 Drawing Sheets

(56) References Cited

U.S. PATENT DOCUMENTS

| | | | | |
|---|---|---|---|---|
| 2014/0366127 A1* | 12/2014 | DeLuca | ............... | G06F 21/36 |
| | | | | 726/19 |
| 2015/0073907 A1* | 3/2015 | Purves | ............... | G06Q 20/32 |
| | | | | 705/14.58 |
| 2015/0089666 A1* | 3/2015 | Lee | ............... | G06F 21/53 |
| | | | | 726/27 |
| 2015/0095241 A1* | 4/2015 | Edwards | ............ | G06Q 20/382 |
| | | | | 705/72 |
| 2015/0134526 A1* | 5/2015 | Russell | ............... | G06F 21/31 |
| | | | | 705/44 |
| 2015/0149961 A1* | 5/2015 | Karakotsios | ............ | G06F 3/017 |
| | | | | 715/810 |
| 2015/0339486 A1* | 11/2015 | Shetye | ............... | G06F 21/6218 |
| | | | | 726/28 |
| 2016/0109954 A1* | 4/2016 | Harris | ............... | G06F 3/017 |
| | | | | 345/156 |

* cited by examiner

PREVENTION OF SHOULDER SURFING

BACKGROUND

The present disclosure relates to devices and methods for preventing or reducing instances of shoulder surfing while using a mobile device in a public place.

With the widespread popularity of mobile devices, a user is often using the mobile device in a public place, a crowded place, or a place the user does not trust. This puts the user at risk of a person in the surrounding area observing the user entering sensitive information into the mobile device. Shoulder surfing is an example of this risk and is a common direct observation technique where a person looks over someone's shoulder to get information. Shoulder surfing is commonly used to obtain passwords, PINs, security codes, or other similar sensitive data. For example, if the user wants to unlock their smartphone by entering a four-digit pin, a person in the surrounding area could observe how the user enters the pin. The observing person could then steal the user's mobile device and be able to unlock the device based on how the person observed the user entering the pin.

BRIEF SUMMARY

According to an aspect of the present disclosure, a method may include determining an approximate angle of orientation of a mobile device and selecting one of first or second input key layouts, based upon the approximate angle of orientation. The first input key layout may be a standard layout of alphanumeric characters and the second input key layout may be a disordered layout of the alphanumeric characters. The method may also include displaying the selected one of the first or second input key layouts at a graphical user interface of the mobile device.

According to another aspect of the present disclosure, a method may include determining an approximate angle of orientation of a mobile device and selecting one of first, second, or third input key layouts, based upon the approximate angle of orientation. The first input key layout may be a standard layout of alphanumeric characters, the second input key layout may be a first disordered layout of the alphanumeric characters, and the third input key layout may be a second disordered layout of the alphanumeric characters. The method may also include displaying the selected one of the first, second, or third input key layouts at a graphical user interface of the mobile device.

According to another aspect of the present disclosure, a system may include a detector operable to detect an approximate angle of orientation of a mobile device and a processor configured to execute program instructions to: select one of first and second input key layouts, based upon the approximate angle of orientation, wherein the first input key layout comprises a standard layout of alphanumeric characters and the second input key layout comprises a disordered layout of the alphanumeric characters. The system may also include a graphical user interface configured to display the selected one of the first and second input key layouts.

Other objects, features, and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1A:
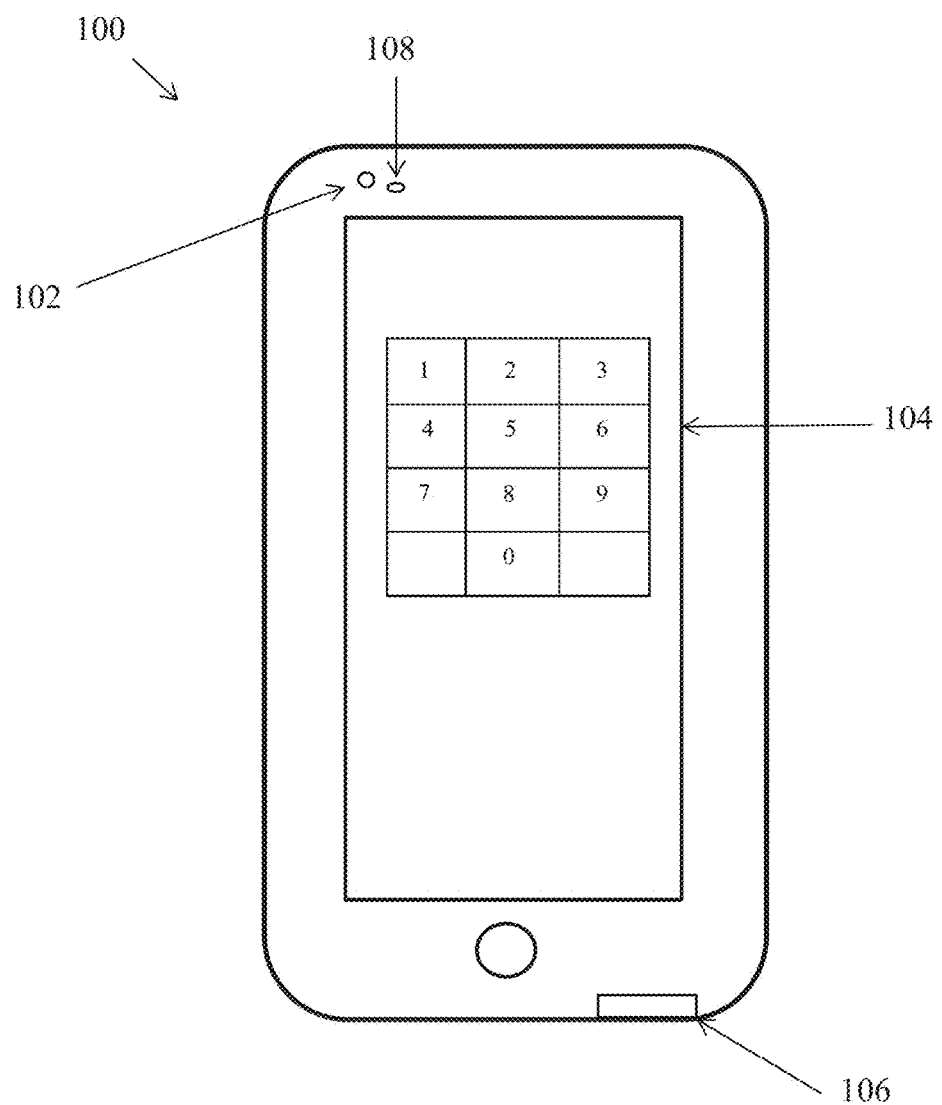
FIGS. 1a and 1b illustrate a mobile device, in accordance with the teachings of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to infrastructure management, systems and methods disclosed herein may be related to other areas beyond network infrastructure. Systems and methods disclosed herein may be related to, and used by, any predictive system that utilizes expert learning or other predictive methods. Systems and methods disclosed herein may be applicable to a broad range of applications that, such as, for example, research activities (e.g., research and design, development, collaboration), commercial activities (e.g., sales, advertising, financial evaluation and modeling, inventory control, asset logistics and scheduling), IT systems (e.g., computing systems, cloud computing, network access, security, service provisioning), medicine (e.g., diagnosis or prediction within a particular specialty or sub-specialty), and other activities of importance to a user or organization.

In view of the foregoing, a need has arisen for ways to prevent or reduce the instances of shoulder surfing while a user operates a mobile device, including when a user is entering sensitive information into the mobile device in a public, crowded, or untrustworthy setting.

Devices and methods disclosed herein may provide a way to reduce shoulder surfing by using sensors in a mobile device to determine an angle at which a user is holding the device.

Figure 1B:
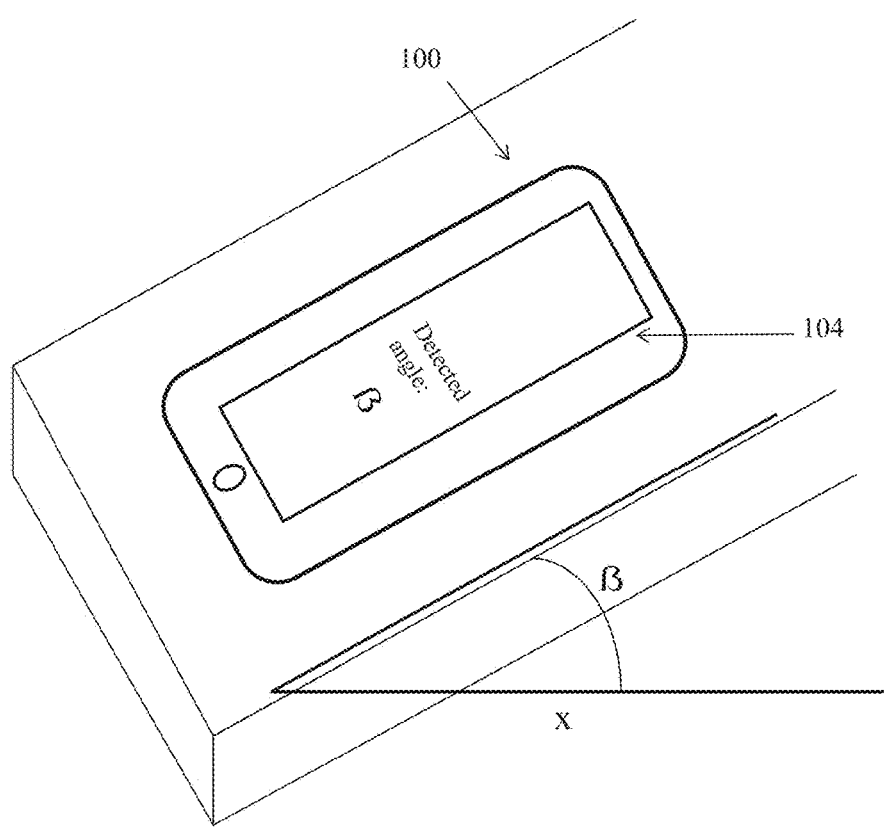

Referring now to FIGS. 1a & 1b, a mobile device 100 according to an embodiment is depicted. The mobile device 100 may include a camera 102, a screen 104, a microphone 106, and a light 108, as depicted in FIG. 1a. The mobile device 100 may include a mobile background service, which continually calculates an angle of the mobile device with respect to gravity, as shown in FIG. 1b. The calculated angle $\beta$ may displayed to the user on the screen 104. The angle is calculated by the mobile background service using sensors built-in to the mobile device. The screen may become blank when the mobile device is held in a position which is susceptible to shoulder surfing. The sensors are already built in to the mobile device and the calculation of the angle is performed by software running on the device. Thus, the screen 104 is an example and the screen may any suitable display that is able to receive a user input.

According to an embodiment, the mobile device 100 may be a cell phone. In the course of using the phone, the user may open a screen where sensitive data, like a PIN or a password, is to be entered, or the user may be required to enter sensitive data before unlocking the phone for use. A mobile application running on the phone may have an event listener that may be triggered just prior to the user being shown the screen on which to enter sensitive data, such as an initial lock screen or a page within an application. For example, opening a mobile application, like a mobile banking application, which requires entering a PIN, or other sensitive information, before accessing the application may trigger security measures. The event listener may make an operating system (OS) application programming interface (API) that may enable security measures. Such security measures may include, but are not limited to, rearranging the keys displayed on the screen of the device or only allowing the user to enter data only when the device is at a particular angle.

Figure 2A:
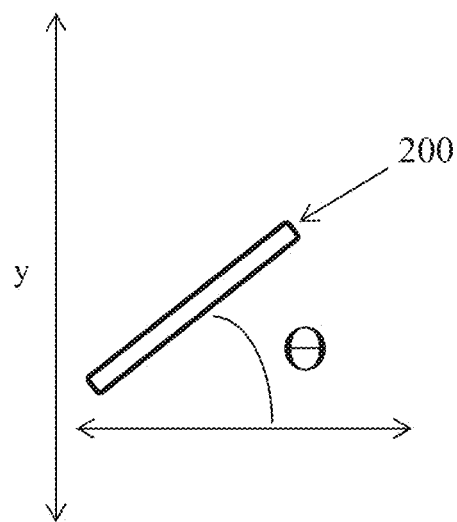
FIGS. 2a and 2b illustrate a mobile device positioned at different angles, in accordance with the teachings of the present disclosure.
Figure 2B:
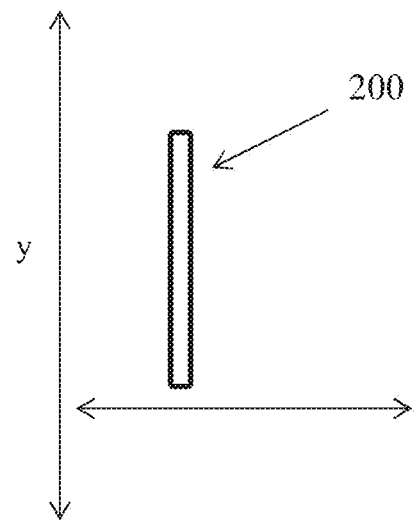
Figure 3:
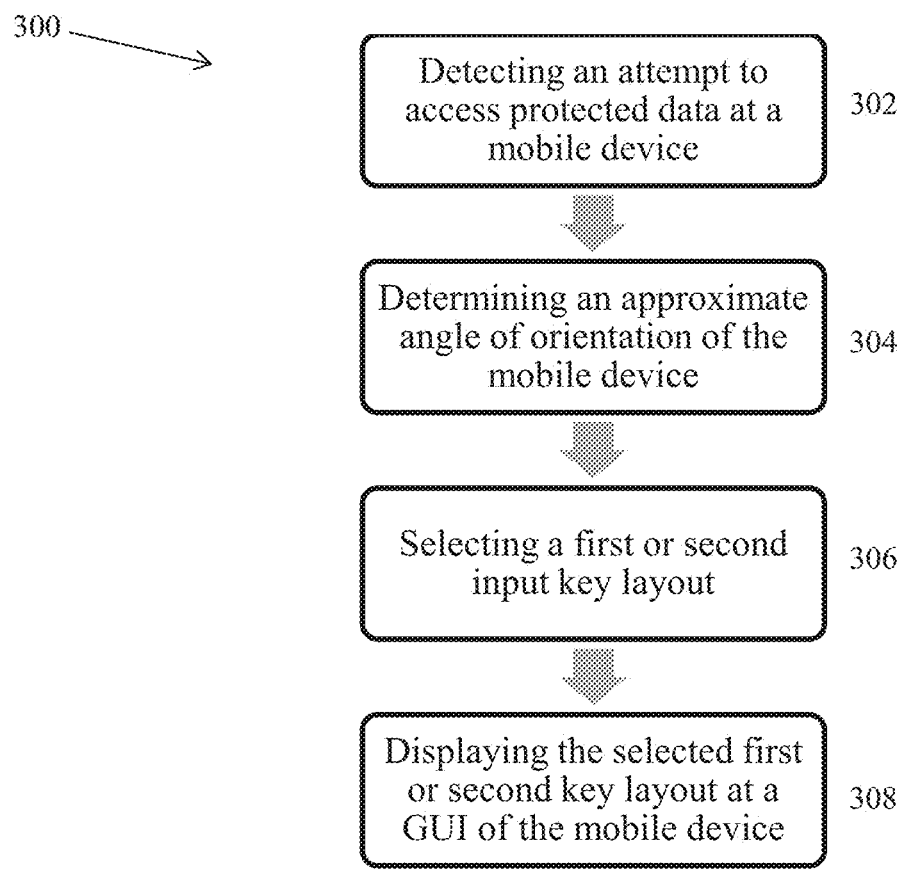
FIG. 3 illustrates a flow chart of a method, in accordance with the teachings of the present disclosure.

In an embodiment, the mobile device 100 may be a cell phone, more specifically a smart phone, 200 held by a user. The mobile background service may use data from the sensors built-in to the cell phone 200 to determine the angle at which the user is holding the phone 200 with respect to gravity. For example, as depicted in FIG. 2a, the user may be holding the cell phone 200 at a 45° angle ($\theta$) with respect to gravity (y). As depicted in FIG. 2b, the user may also be holding the cell phone 200 parallel to their body.

In an embodiment, a method 300 begins with an attempt by a user of the mobile device to access protected data, at step 302. Protected data may include any screen or application that requires a PIN, password, or other sensitive information to be entered before the screen or application is displayed, opened, or otherwise made available to a user of the mobile device. At step 304, the angle of orientation of the mobile device is determined. A first or second input key layout is selected at step 306 and the selected first or second input key layout is displayed at a graphical user interface (GUI) of the mobile device at step 308.

Based on the angle at which the user is holding the phone 200, or other mobile device 100, the application will select a particular layout of keys and rearrange the location of a plurality of keys 210 on a touch-screen 204 in accordance with the selected layout. The user may use the plurality of keys 210 to input a PIN or other sensitive information into the phone 200, or mobile device 100, via the touch-screen 204 or any other suitable input mechanism. The keys 210 may be alphanumeric characters, or any other suitable mechanism for inputting a PIN or other sensitive information. The particular layout of keys 210 to be selected may be determined by comparing the angle of the phone 200, or mobile device 100, to a threshold value. For example, the angle the phone 200 is being held by the user may be determined to be a 45° angle. If this determined angle is greater than a threshold value, the keys 210 may be jumbled and placed in randomly selected locations on the screen 204 in a first input key layout, such as the arrangement depicted in FIG. 4.

Figure 4:
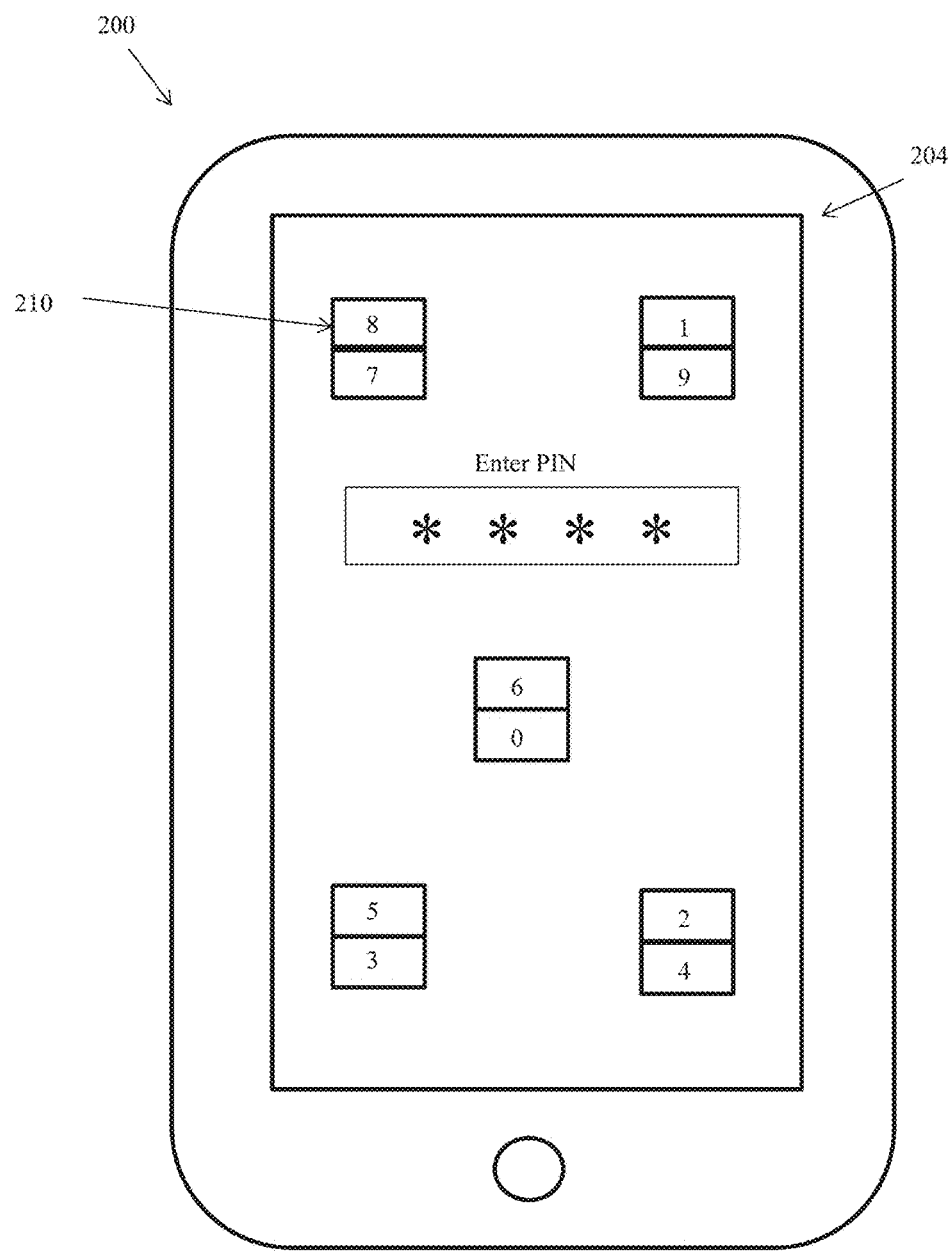
FIG. 4 illustrates an arrangement of keys on a screen of a mobile device, in accordance with the teachings of the present disclosure.
Figure 5:
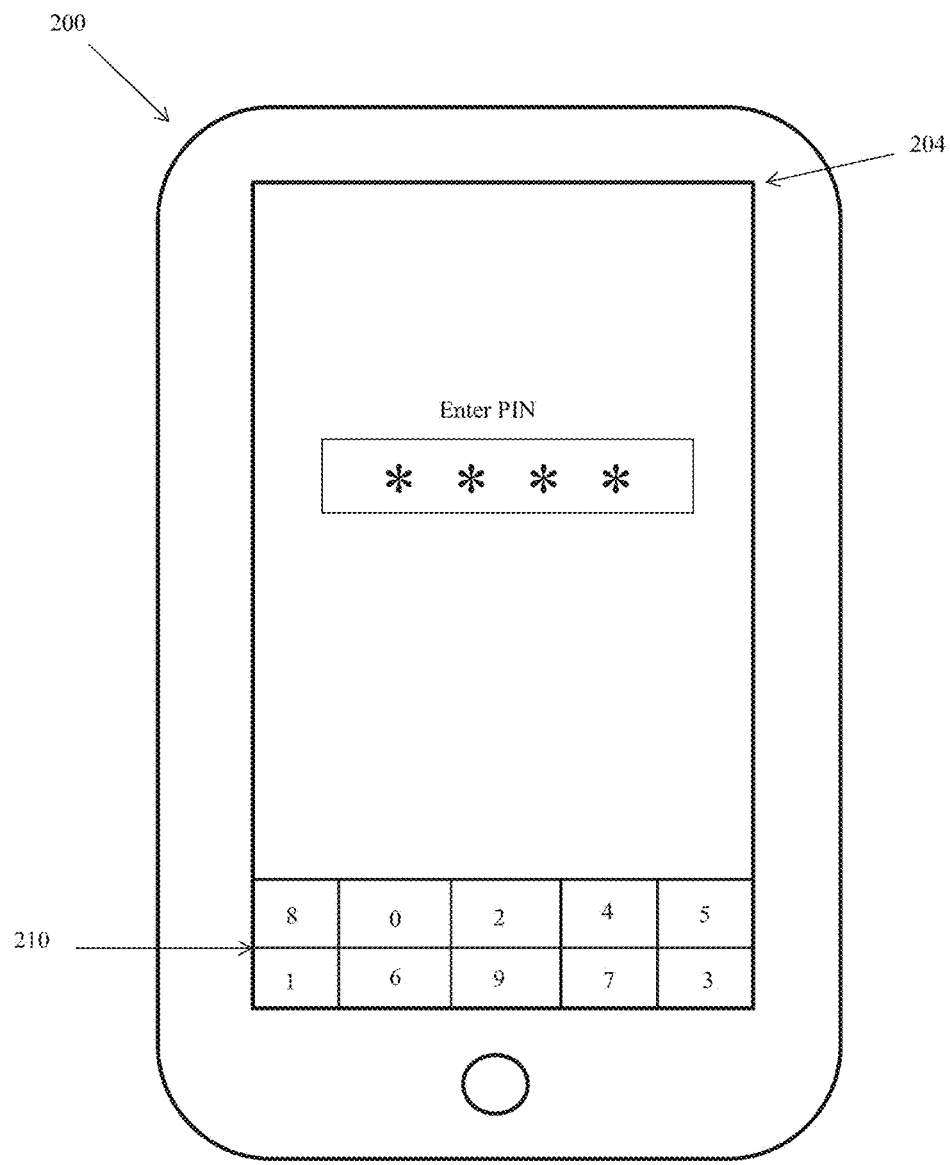
FIG. 5 illustrates another arrangement of keys on a screen of a mobile device, in accordance with the teachings of the present disclosure.

The determined angle may also be compared to a first threshold value and a second threshold value. In the embodiment of FIG. 4, the determined 45° angle may compared to a first threshold value and a second threshold value and be between the first threshold and the second threshold. In another example, it may be determined that the mobile device 200 is being held parallel to the user. This determined angle may be greater than the second threshold value, resulting in the keys 210 being jumbled and placed in randomly selected locations on the screen in a second input key layout, such as depicted in FIG. 5. The first and second threshold values may be any suitable value to prevent shoulder surfing. The keys 210 may also be displayed on the screen 204A in a default or standard input key layout, such as depicted in FIG. 1*a*, if the determined angle indicates no or low risk of shoulder surfing. These rearrangements of keys 210 depicted in FIGS. 1*a*, 4, & 5 are examples and may be any suitable arrangement of keys that will reduce the chances of successful shoulder surfing.

The protocols to rearrange the keys based on the determined angle may be run by an operating system of the cell phone 200. The operating system may provide an option to designate that a field is sensitive. For example, in the case of Android, an edit text has options like android:numeric, android:phonenumber, etc. If an edit text such as android: sensitive is set to true, when the screen of the cell phone 200 focus goes to this edit text, then security measures such as rearranging key location on the keypad, may be initiated. Similarly, an operating system may provide an option to designate that the field is sensitive and security measures, such as switching on a front LED light 108, depicted in FIG. 1*a*, may be triggered. Another option is to only allow the user of the cell phone 200 to enter sensitive information when the cell phone 200 is held at a particular angle. The arrangements of keys based on the angle at which the device is held depicted in FIGS. 4 & 5 are examples and the keys can be rearranged in any suitable format that will reduce the chances of shoulder surfing.

According to another embodiment, the mobile device 100 may make an intelligent decision by capturing surrounding details, such as by using a camera 102 and/or microphone 106 built into the device. The decisions may be made based on surrounding details sensed by the camera 102 and/or microphone 106, including but not limited to the presence of other person(s) around the mobile device, other person(s) looking straight at a screen of the mobile device, or an angle at which other person(s) are looking at the screen of the mobile device. Based on these environmental surrounding details captured by the device, an application running on the device may make an intelligent decision on how and where to display keys or other input mechanism for the user to enter sensitive information in a manner that reduces the chances of shoulder surfing, such as the arrangements depicted in FIGS. 4 & 5. The mobile device 100 may also suggest an angle at which the user should hold the device when entering sensitive information based on what the camera and microphone sense.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising: detecting at a mobile device, an attempt by a user to access protected data; determining an approximate angle of orientation of the mobile device; receiving information about a surrounding environment of the mobile device from a sensor integrated with the mobile device, wherein the sensor comprises a camera or a microphone; selecting one of first or second input key layouts, based upon the approximate angle of orientation, wherein, the first input key layout comprises a standard layout of alphanumeric characters and the second input key layout comprises a disordered layout of the alphanumeric characters; displaying the selected one of the first or second input key layouts at a graphical user interface of the mobile device, wherein displaying the second input key layout comprises displaying the alphanumeric characters in a jumbled manner such that the alphanumeric characters are out of alphanumeric order on the graphical user interface; and suggesting an angle at which a user should hold the mobile device when entering sensitive information based on the information received about the surrounding environment.

2. The method of claim 1, wherein determining the approximate angle of orientation comprises determining whether the angle exceeds a threshold value; and wherein selecting one of the first and second input key layouts comprises selecting the second input key layouts in response to determining the angle exceeds the threshold value.

3. The method of claim 1, further comprising: receiving an input of sensitive information at the graphical user interface from the selected one of the first or second input key layouts; and providing access to the protected data.

4. Tire method of claim 1, further comprising: providing an option to designate that a field is sensitive; opening a screen where sensitive data is to be entered; and determining, for the open screen, whether the field is designated as sensitive.

5. The method of claim 1, further comprising: determining, based on the received information, whether a risk factor is present in the surrounding environment, wherein selecting one of first and second input key layouts comprises selecting the second input key layout in response to determining the risk factor is present.

6. The method of claim 5, wherein determining, based on the received information, whether the risk factor is present in the surrounding environment comprises determining whether a person or persons other than a user of the mobile device is present around the mobile device.

7. The method of claim 5, wherein determining, based on the received information, whether a risk factor is present in the surrounding environment comprises determining whether a person other than a user of the mobile device is looking at the graphical user interface of the mobile device.

8. A method comprising: detecting at a mobile device, an attempt by a user to access protected data; determining an approximate angle of orientation of a mobile device; receiving information about a surrounding environment of the mobile device from a sensor integrated with the mobile device, wherein the sensor comprises a camera or a microphone; selecting one of first, or second, input key layouts, based upon the approximate angle of orientation, wherein, the first input key layout comprises a standard layout of alphanumeric characters, and the second input key layout comprises a first disordered layout of the alphanumeric characters; displaying the selected one of the first or second, input key layouts at a graphical user interface of the mobile device, and suggesting an angle at which a user should hold the mobile device when entering sensitive information based on the information received about the surrounding environment.

9. The method of claim 8, further comprising a third input key layout comprising a second disordered layout of the alphanumeric characters and wherein determining the approximate angle of orientation comprises determining whether the angle is between a first threshold value and a second threshold value; and wherein selecting one of the first or second, input key layouts comprises selecting one of the first, second or third input key layouts; and selecting the second input key layout in response to determining the angle is between the first threshold value and the second threshold value, and selecting the third input key layout in response to determining the angle exceeds the second threshold value.

10. The method of claim 8, further comprising: receiving an input of sensitive information at the graphical user interface from the selected one of the first, second, or third input key layouts; and providing access to protected data.

11. The method of claim 8, further comprising: providing an option to designate that a field is sensitive; opening a screen where sensitive data is to be entered; and determining, for the open screen, whether the field is designated as sensitive.

12. The method of claim 8, wherein displaying the second input key layout comprises displaying the alphanumeric characters in a jumbled manner such that the alphanumeric characters are out of alphanumeric order on the graphical user interface.

13. A system comprising: a detector operable to detect at a mobile device, an attempt by a user to access protected data and to detect an approximate angle of orientation of a mobile device; a processor configured to execute program instructions to: select one of first and second input key layouts, based upon the approximate angle of orientation, wherein the first input key layout comprises a standard layout of alphanumeric characters and the second input key layout comprises a disordered layout of the alphanumeric characters; receive information about a surrounding environment of the mobile device from a sensor integrated with the mobile device, wherein the sensor comprises a camera or a microphone; and determine an angle at which a user should hold the mobile device when entering sensitive information based on the information received about the surrounding environment; and a graphical user interface configured to display the selected one of the first and second input key layouts, wherein the graphical user interface is configured to display the second input key layout by displaying the alphanumeric characters in a jumbled manner such that the alphanumeric characters are out of alphanumeric order on the graphical user interface.

14. The system of claim 13, wherein the detector is further operable to determine whether the angle exceeds a predetermined minimum; and wherein the processor is further configured to select the second input key layout in response to determining the angle exceeds the predetermined minimum.

15. The system of claim 14, wherein the processor is further configured to: select one of first, second, or third input key layouts, wherein, the third input key layout comprises a second disordered layout of the alphanumeric characters, and wherein, the disordered layout and the second disordered layout are different arrangements of the alphanumeric characters.

16. The system of claim 15, wherein the detector is further operable to determine whether the angle is between a predetermined minimum and a predetermined maximum, and wherein the processor configured to select one of the first or second input key layouts is further configured to select the second input key layout in response to determining the angle is between the predetermined minimum and the predetermined maximum, and to select the third input key layout in response to determining the angle exceeds the predetermined maximum.

17. The system of claim 13, further comprising: the graphical user interface configured to receive an input of sensitive information from the selected one of the first and second input key layouts, and wherein the processor is configured provide access to protected data for display on the graphical user interface.

18. The system of claim 13, the processor further configured to: provide an option to designate that a field is sensitive; and determine whether the field is designated as sensitive when the mobile device focuses on a screen where sensitive information is to be entered.

19. The system of claim 13, wherein the processor is further configured to select the second input key layout in response to receiving information that people are detected in the environment surrounding the mobile device.

20. The system of claim 13, wherein the user interface is operable to suggest an angle at which a user should hold the mobile device when entering sensitive information based on the information received about the surrounding environment.

* * * * *